United States Patent [19]
Linde et al.

[11] Patent Number: 5,882,395
[45] Date of Patent: Mar. 16, 1999

[54] PROCESS FOR PRODUCING INORGANIC GRANULES AND THE USE THEREFOR

[75] Inventors: Günter Linde, Krefeld; Lothar Steiling, Leverkusen, both of Germany

[73] Assignee: Bayer Aktiengesellschaft, Germany

[21] Appl. No.: 908,878

[22] Filed: Aug. 8, 1997

[30] Foreign Application Priority Data

Aug. 16, 1996 [DE] Germany ............ 196 32 928.0

[51] Int. Cl.⁶ .................................... C09C 1/22
[52] U.S. Cl. ............ 106/460; 106/425; 106/429; 106/436; 106/437; 106/447; 106/453; 106/456; 106/459; 106/712
[58] Field of Search .................. 106/712, 425, 106/429, 436, 437, 447, 453, 456, 459, 460

[56] References Cited

U.S. PATENT DOCUMENTS 5,212,583  5/1993  Krockert et al. ............ 106/712
5,215,584  6/1993  Buxbaum et al. ............ 106/712

Primary Examiner—Mark L. Bell
Assistant Examiner—Scott L. Hertzog
Attorney, Agent, or Firm—Connolly & Hutz

[57] ABSTRACT

The present invention relates to a process for producing inorganic granules and to their use for the coloring of building materials, particularly concrete, asphalt, plaster, mortar and cement mortar, and for the production of paints for the protection of buildings.

7 Claims, No Drawings

PROCESS FOR PRODUCING INORGANIC GRANULES AND THE USE THEREFOR

BACKGROUND OF THE INVENTION

The present invention relates to a process for producing inorganic granules and to the use thereof for the coloring of building materials, particularly concrete, asphalt, plaster and mortar, and for the production of slurries and paints for the protection of buildings.

Cement- and lime-bonded building materials such as plaster, sand-lime brick, asbestos cement parts and concrete blocks, particularly roofing tiles and paving stones as well as quarry tiles, are generally colored with inorganic pigments if they are to be of colored form. Thus it is customary in the building materials industry to use iron oxides or iron oxide hydroxides as red, black, brown or yellow pigments, to use manganese oxides as brown-black pigments, to use chromium oxides as green pigments and to use titanium dioxides as white pigments. Other examples include the use of carbon blacks as black pigments, nickel or chromium rutiles as yellow pigments, spinels which contain cobalt as blue and green pigments, spinels which contain copper as black pigments and mixed crystals of barium sulphate and barium manganate as blue pigments.

For coloring building materials, the pigments are normally used in powder form. In their ground form they have the advantage of good dispersibility. Pigment powders such as these have to be dispersed completely uniformly within a short time in concrete, for example. The disadvantage of these fine powders is that they do not exhibit good flow behaviour and frequently cake together and form lumps on storage. Adding them in accurately metered amounts is thereby made difficult. Another disadvantage of powders is that they tend to form dust.

It is known that these disadvantages can be avoided during the pigmentation of concrete parts by using aqueous suspensions of pigments instead of dry pigment powders. The use of pastes or slurries of this type, which contain 30 to 70% pigment by weight, has only been accepted with reluctance. In particular, and depending on the distance between the site of manufacture and the site of use, the additional water content can result in considerably higher transport costs. Moreover, the large amount of water which is supplied in conjunction cannot be processed in every concrete formulation.

The major part of the building materials industry has therefore kept to the use of dry powders. The understanding that granules are less readily dispersible in concrete formulations has hitherto stood in the way of the use of pigments in the form of microgranules. Pigment agglomerates or granules which are difficult to disperse necessitate considerably longer mixing times. If the normal short mixing times which are customary in the building materials industry are employed, stippled effects, streaks or pockets of color are formed at the surface of the concrete as a result of poor pigment distribution. Moreover, the strength of color contained in the pigment cannot develop, so that higher contents of pigment have to be used to obtain the same intensity of color of the concrete part.

DE-C-3 619 363 (U.S. Pat. No. 4,946,505, Jungk) describes pigment granules for coloring concrete materials which substantially consist of pigment and one or more binder(s) which enhance the dispersibility of the pigment in concrete. The following are cited as binders which act as dispersing aids in concrete: alkylbenzene sulphonate, alkylnaphthalene sulphonate, lignosulphonate, sulphated polyglycol ethers, melamine-formaldehyde condensates, naphthalene-formaldehyde condensates, gluconic acid, salts of low molecular weight, partially esterified styrene-maleic anhydride copolymers, and copolymers of vinyl acetate and crotonic acid. The content of substances such as these in the pigment is preferably 2 to 6% by weight.

DE-C-4 119 667 (U.S. Pat. No. 5,215,583, Kröckert et al) describes a process in which pigment granules are produced by spray-drying, using soluble salts of the first two main groups of the periodic table. This process can also be employed for the granulation of aqueous suspensions or pastes. However, in some cases additives, for example additions of binders, result in an increase in viscosity which has to be compensated for by the addition of water. However, the economic viability of spray granulation is thereby reduced, because more water has to be evaporated with respect to the solid.

U.S. Pat. No. 5,401,313 describes the production of pigments as powders and as granules from aqueous suspensions in two stages, by spray-drying with electrochemical and chemical modification of the surface. On account of its precipitation stage, this process can only be employed for very dilute pigment concentrations of less than 10% solids. This means that high energy costs are inevitably incurred for the spray-drying stage.

The use of phosphates or lignosulphonates—as is described in some of the documents cited above— particularly in higher concentrations when applied to concrete, results in effects which are in part unwanted, for example to a lengthening of the setting time of the concrete. Moreover, despite their dispersion-stabilizing properties which are due to their high charge density, silicates are not always suitable due to the formation of difficultly soluble compounds (due to carbonization) over the course of time. The time of dispersion to obtain a uniform coloration is thereby increased. In some cases the viscosity of the suspension is increased before atomisation by the addition of inorganic binders. Flowability then has to be established again by corresponding dilution. However, the drying costs are at the same time increased due to the increased amount of water to be. evaporated.

SUMMARY OF THE INVENTION

The object of the present invention was to provide a process which enables pigment granules to be produced which do not have the aforementioned disadvantages.

It has been possible to achieve this object by the use, apart from known binders, of organic or metallo-organic compounds in addition.

DETAILED DESCRIPTION OF THE INVENTION

The present invention relates to a process for producing inorganic pigment granules and inorganic filler granules which comprise one or more pigments or fillers and one or more inorganic binders, which have a water content of not more than 5% by weight, and the particle diameter of which is between 100 $\mu$m and 2 mm. A salt is added as a binder to an aqueous suspension of pigment or filler, and an organic or metallo-organic liquefying agent is added in addition, and this suspension is subsequently converted into granules. The organic liquefying agent or the organic fraction in the metallo-organic liquefying agent is thermally decomposed without organic residues remaining in the granular material.

In accordance with the process according to the invention, the binder and the additional compound are preferably added to an aqueous suspension of the powder. The additional organic compound or the organic part thereof is thermally decomposed during the granulation operation or is decomposed subsequent to the granulation operation during a drying or heat-treatment step which is optionally carried out.

The granulation operation is carried out, for example, by spray granulation in spray driers comprising nozzles or atomising discs. However, it can also be effected by the agglomerative granulation (pan or drum granulation) of what is preferably partly dried material, by mixer agglomeration or by fluidised bed granulation and also by a combination of a plurality of methods. Granulation can also be effected by the molding of pastes with subsequent drying, followed by size reduction.

All commercially available granulating apparatuses are suitable apparatuses.

The heat treatment step which is optionally carried out in addition can be conducted, for example, in conventional installations, such as rotary kilns, continuous kilns or fluidised beds under inert, oxidising or reducing atmospheres at temperatures from 120° C. to 550° C., preferably from 150° C. to 350° C. In addition to being conducted under normal pressure, the thermal treatment may also be conducted under an overpressure or under reduced pressure. It is also possible to atomize inorganic pigments or fillers at elevated temperatures from 500° C. to 1000° C.

Suitable binders include water-soluble salts, such as sulphates, chlorides, fluorides, nitrates, carbonates, silicates, phosphates, sulphites, selenates, aluminates, borates of alkali and alkaline earth metals and of other metals (e.g. aluminium and iron) and of ammonium for example; magnesium sulphate is particularly suitable. The amount used with respect to the pigment is between 0.01 and 10% by weight, preferably 0.05 to 5% by weight, most preferably 0.2 to 4% by weight.

All organic compounds which have low boiling points up to 250° C. or low decomposition temperatures up to 350° C. and which have a liquefying effect on suspensions of inorganic pigments or fillers containing inorganic salts are suitable as liquefying agents.

The compounds which are used in particular as organic compounds or metallo-organic compounds for liquefaction are formic acid, tartaric acid, citric acid, oxalic acid and salts or derivatives thereof (e.g. esters, acid chlorides, etc.), alcoholates, polyacrylates, sulphonates, polyaspartic acid particularly in the form of its ammonium salts, condensation products of formaldehyde with amines in an amount of 0.01 to 10% by weight, preferably 0.1 to 5% by weight. Sodium and ammonium salts of the aforementioned organic compounds are particularly preferred.

Iron oxides, titanium dioxides, chromium oxides, zinc oxide, rutile mixed phase pigments, manganese iron oxides and carbon blacks are preferably used as pigments.

The substances which are preferably used as inorganic filler granules are inorganic compounds with a low coloring strength, such as natural iron oxides, zinc sulphide, alumina, barytes and silica, silicates (talc, clay, mica), calcium carbonate and calcium sulphate.

The granules produced are most preferably also subjected to a subsequent treatment with organic compounds. Depending on their subsequent use (e.g. in plastics, dispersion paints, lacquer systems), defined, preferred organic compounds are frequently selected for this subsequent treatment. The following are cited as examples:

for use in plastics:
  alcohols, carboxylates, esters, silicone compounds, amines, amides, polyethers, polyols;

for use in dispersion paints:
  alcohols, esters, silicone compounds, amines, amides, polyethers, polyols;

for use in lacquer systems:
  alcohols, alcoholates, carboxylates, esters, silicone compounds, amines, amides, polyethers, polyols.

The present invention further relates to the use of the granules produced according to the invention for the coloring of building materials, such as concrete, asphalt and cement mortar mixtures, and for the production of slurries and paints for the protection of buildings.

For coloring concrete and cement mortar, the granules are preferably added to the building material in the mixer; commercially available agitator or mixer units are used for the production of slurries and paints.

The invention is explained in more detail in the following examples, but should not be considered as being limited thereto.

EXAMPLES

Example 1

Production of titanium dioxide granules from Bayertitan R-FK-D (a commercial product of Bayer AG), from a suspension containing 50% solids. The suspension had a viscosity of 122 mPa.s; after adding magnesium sulphate this had increased to 323 mpa.s. It was reduced to 39 mPa.s by adding a polyacrylate (3.8% Polystabil S312 containing 40% of active ingredient—a commercial product supplied by Stockhausen, Krefeld). The viscosity of a 50% suspension was like-wise reduced to 98 mPa.s by adding 1% oxalic acid. After atomization in a commercially available spray drier via a disc, at a water evaporation rate of 20 kg/hour and at inlet and outlet temperatures of 340° C. and 140° C., respectively, and after subsequent heat treatment for 12 hours at 300° C., no carbon originating from the additive was found. Free-flowing granules with a $d_{50}$ of 50 μm were obtained, which could readily be incorporated in building materials.

Example 2

Bayferrox 130 iron oxide red (a commercial product of Bayer AG) was atomized as a suspension containing 60% solids in a spray-drier supplied by Niro, via a disc operating at 12,000 rpm and at a water evaporation rate of 20 kg/hour; the inlet temperature was 350° C. and the outlet temperature was 140° C. The viscosity of the suspension was 14 mPa.s. The granules were very soft. On adding 1% magnesium sulphate as a binder, the viscosity increased to 190 mPa.s. This increased viscosity could be decreased again by the addition of various substances with a liquefying effect:

| | |
|---|---|
| 1% formic acid | gave 136 mPa.s |
| 1% tartaric acid | gave 40 mPa.s |
| 1% aluminium triisopropylate | gave 118 mPa.s. |

After drying or subsequent heat treatment for 12 hours at 300° C., no carbon originating from the liquefying agent was detected. The granules obtained were of relatively good stability and could be incorporated in concrete blocks just as readily as powders.

Example 3

Cromoxid GN (a commercial product of Bayer AG) had a viscosity of 324 mPa.s as a 50% suspension. This was increased by about 10% on adding a binder such as 1% magnesium sulphate. The addition of a condensed organic polyacid or of a corresponding salt, such as 0.33% polyaspartic acid for example, effected an appreciable reduction of the viscosity to 135 mPa.s. After atomization and heat treatment for 12 hours at about 350° C., no carbon from the liquefying agent was found.

Similarly, organically bonded carbon was no longer detected after heat treatment when employing additions of 1% calcium formate or 0.5% polyacrylate to titanium dioxide. All the granules could be incorporated in concrete just as readily as the powders on which they were based.

Example 4

A suspension of Bayferrox 330 iron oxide black (a commercial product of Bayer AG) had the following properties when 3% magnesium sulphate was used as a binder:

| | |
|---|---|
| at 50% solids | liquid |
| at 55% solids | viscous |
| at 60% solids | paste-like. |

A 55% suspension containing 3% magnesium sulphate could readily be atomized by the addition of organic liquefying agents such as 2% formic acid or 5% of the sodium salt of polyasparaginic acid.

Bayferrox 330 containing 55% solids plus 3% magnesium sulphate and 2% formic acid was atomized in a co-current nozzle drier at an inlet temperature of 400° C. and an off-gas temperature of 160° C., through a hollow cone nozzle supplied by Schick with a bore of 1 mm and a spray angle of 30°. The granules produced had an average particle size of about 200 $\mu$m. This material was free-flowing and could readily be added in metered amounts. The perceived color after its incorporation in concrete was like that obtained using powder. The carbon content of the powder was 1.32%; this was increased to 1.84% by the addition of formic acid to the slurry. 1.28% carbon was found in the granulated material. The carbon content was reduced to less than 1% by subsequent heat treatment; it was reduced to 0.8% at 400° C. and to 0.47% at 550° C. (temperature of subsequent heat treatment).

We claim:

1. A process for producing inorganic pigment granules and inorganic filler granules which comprise of one or more pigments or fillers and one or more inorganic binders, which have a water content of not more than 5% by weight, and the particle diameter of which is between 100 $\mu$m and 2 mm, comprising the steps of adding a salt as a binder to an aqueous suspension of pigment or filler, and adding an organic or metallo-organic liquefying agent in addition, and subsequently converting the suspension into granules, wherein the organic liquefying agent or the organic fraction in the metallo-organic liquefying agent is thermally decomposed without organic residues remaining in the granular material.

2. A process according to claim 1, wherein inorganic metal salts from the group consisting of borates, carbonates, silicates, sulphates, sulphites, selenates, chlorides, fluorides, phosphates, nitrates and aluminates are used as binders in an amount of 0.01 to 10% by weight.

3. A process according to claim 1, wherein the liquefying agent is selected from the group consisting of formic acid, tartaric acid, citric acid, oxalic acid and salts or derivatives thereof, polyacrylates, polyaspartic acid, sulphonates, alcoholates or condensation products of formaldehyde with amines, and the liquefying agents are used in an amount of 0.01 to 10% by weight.

4. A process according to claim 1, wherein iron oxides, titanium dioxides, chromium oxides, zinc oxide, rutile mixed phase pigments, manganese iron oxides and carbon blacks are used as pigments.

5. A process according to claim 1, wherein inorganic compounds of low coloring strength, selected from the group consisting of silica, silicates, calcium carbonate and calcium sulphate are uses as fillers.

6. A process according to claim 1, wherein the step of converting the suspension into granules is selected from spray-drying, agglomerative granulation, fluidized bed processes, molding of pastes with subsequent drying, pressing or compaction processes with subsequent drying, and by a combination of these process steps.

7. A process for the coloring of building materials and for the production of slurries and paints for the protection of buildings comprising the step of adding granules obtained by the process of claim 1 to said building materials, slurries or paints.

* * * * *